United States Patent [19]

Krajcir

[11] Patent Number: 5,667,738
[45] Date of Patent: Sep. 16, 1997

[54] METHODS FOR THE PRODUCTION OF RESILIENT MOLDED HEELS FOR BOOTS AND SHOES

[76] Inventor: Dezi A. Krajcir, 330 Ramsey Drive, Dunnville, Ontario, Canada, N1A 2X1

[21] Appl. No.: 639,547

[22] Filed: Apr. 29, 1996

Related U.S. Application Data

[63] Continuation of Ser. No. 260,243, Jun. 14, 1994, abandoned.

[51] Int. Cl.⁶ .................... B29C 44/04; B29C 44/12
[52] U.S. Cl. .................... 264/45.5; 264/46.7; 264/244; 264/572; 425/129.2
[58] Field of Search .................... 264/45.5, 572, 264/50, 244, 46.7; 36/35 B, 35 R; 425/129.2

[56] References Cited

U.S. PATENT DOCUMENTS

| | | | |
|---|---|---|---|
| 576,811 | 2/1897 | Doughty | 264/572 |
| 1,011,460 | 12/1911 | Maddocks | 36/35 B |
| 1,430,677 | 10/1922 | Ose | 264/572 |
| 2,532,742 | 12/1950 | Stoiner | 36/35 B |
| 2,743,483 | 5/1956 | Parini | 264/572 |
| 3,044,190 | 7/1962 | Urbany | 36/35 R |
| 3,447,251 | 6/1969 | Drexler | 425/129.2 |
| 3,577,503 | 5/1971 | Innocenti | 425/129.2 |
| 3,596,381 | 8/1971 | Fukuoka | 264/45.5 |
| 3,659,996 | 5/1972 | Schwarz et al. | 425/129.2 |
| 3,705,934 | 12/1972 | Giannini | 425/129.2 |
| 4,165,958 | 8/1979 | Malburg et al. | 425/129.2 |
| 4,296,053 | 10/1981 | Doerer et al. | 264/45.5 |
| 4,886,238 | 12/1989 | Davis | 425/129.2 |
| 5,112,560 | 5/1992 | Moumdjian | 264/516 |
| 5,204,051 | 4/1993 | Jaroschek | 264/572 |

FOREIGN PATENT DOCUMENTS 2073006  10/1981  United Kingdom .................... 36/35 B Primary Examiner—Allan R. Kuhns
Attorney, Agent, or Firm—McConnell and Fox

[57] ABSTRACT

In the molding of boot and shoe heels a foamable plastics molding material is injected into a heel mold and a pressurized gaseous fluid is injected into the heel body after it has formed an outer skin against the mold inner surfaces but before it has fully set in order to displace and compress the foaming material and form within the heel at least one enclosed hollow chamber which provides a different degree of resilience to heel strike forces at the location of the chamber. A plurality of closely adjacent chambers may be provided to obtain the same effect, particularly when the heel is shallow. A preformed member may be placed in the mold to form the heel outer surface and ensure a minimum heel wall thickness at this location. The invention also includes apparatus for making such heels, and the heels when so made. The molded body may comprise a sole with an integral heel part. The enclosed chamber may be vented to the ambient atmosphere or it may be sealed. The chamber may be at least partly filled with a material of resilience different from that of the material from which the heel is molded. In another method a chamber is formed in the heel by a preformed hollow member attached to the underside of the boot or shoe upper, the member being incorporated into the shoe heel by the molding operation. An insole has a plug of lower resilience material that fits into the chamber formed by the hollow element to determine the resilience to heel strike.

8 Claims, 3 Drawing Sheets

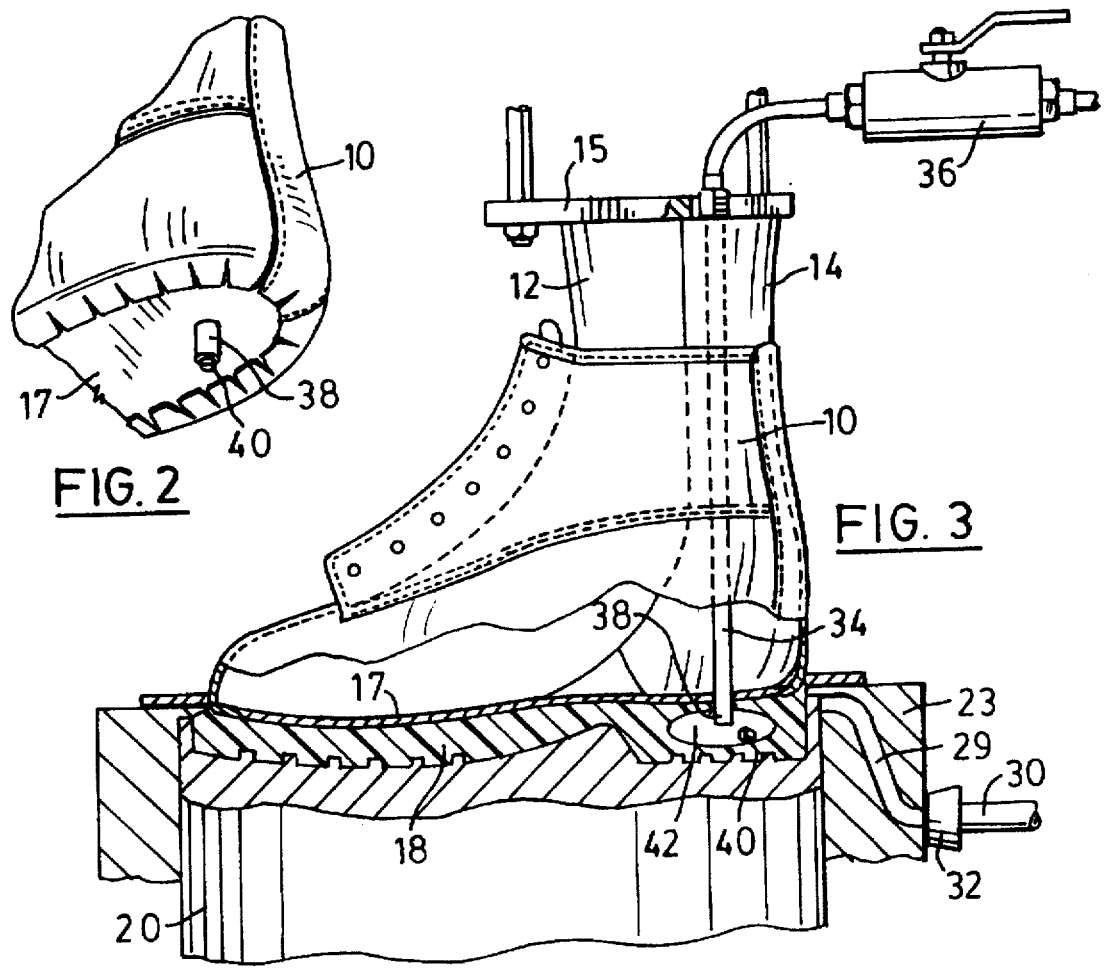
FIG. 2
FIG. 3
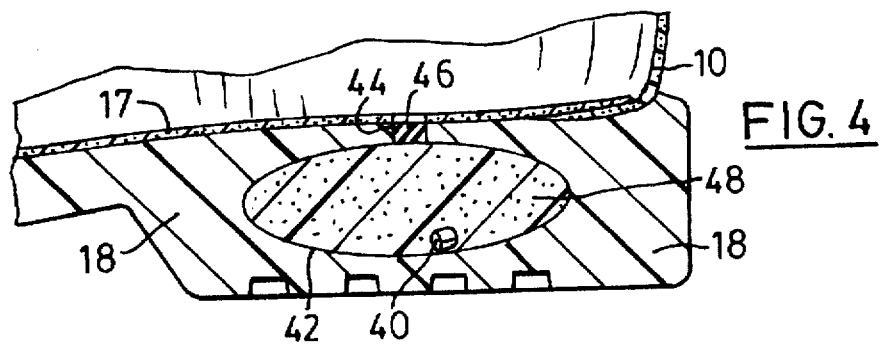
FIG. 4
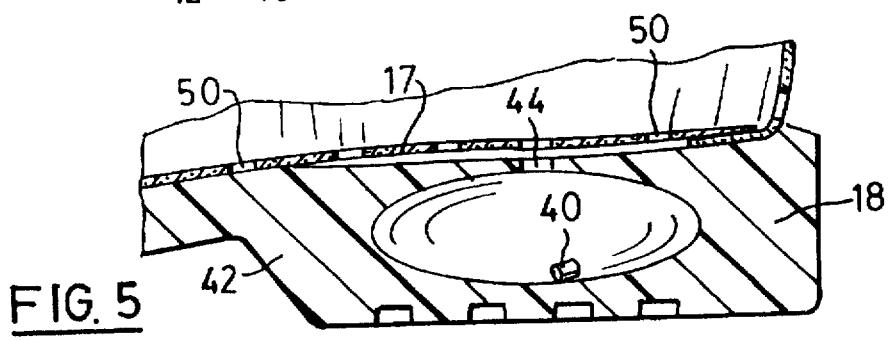
FIG. 5

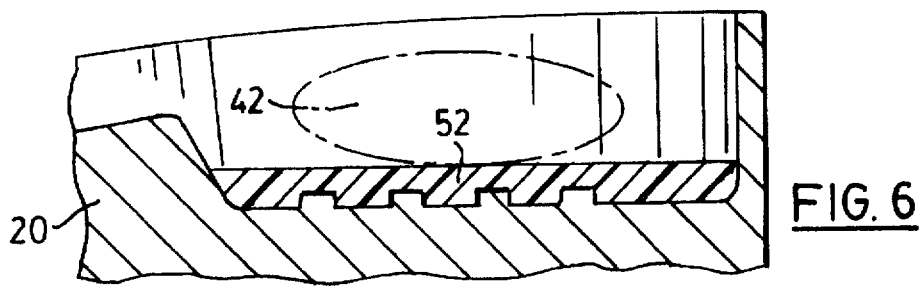
FIG. 6
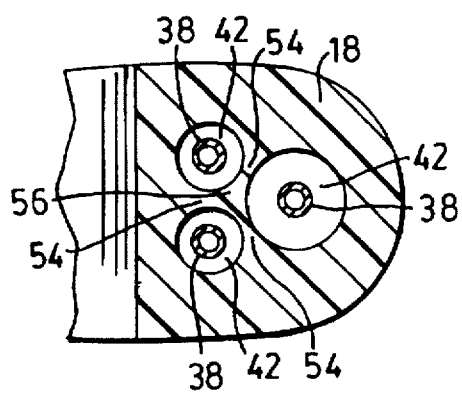
FIG. 7
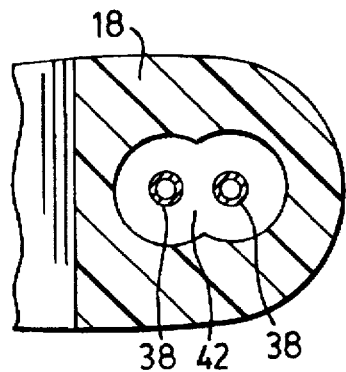
FIG. 8
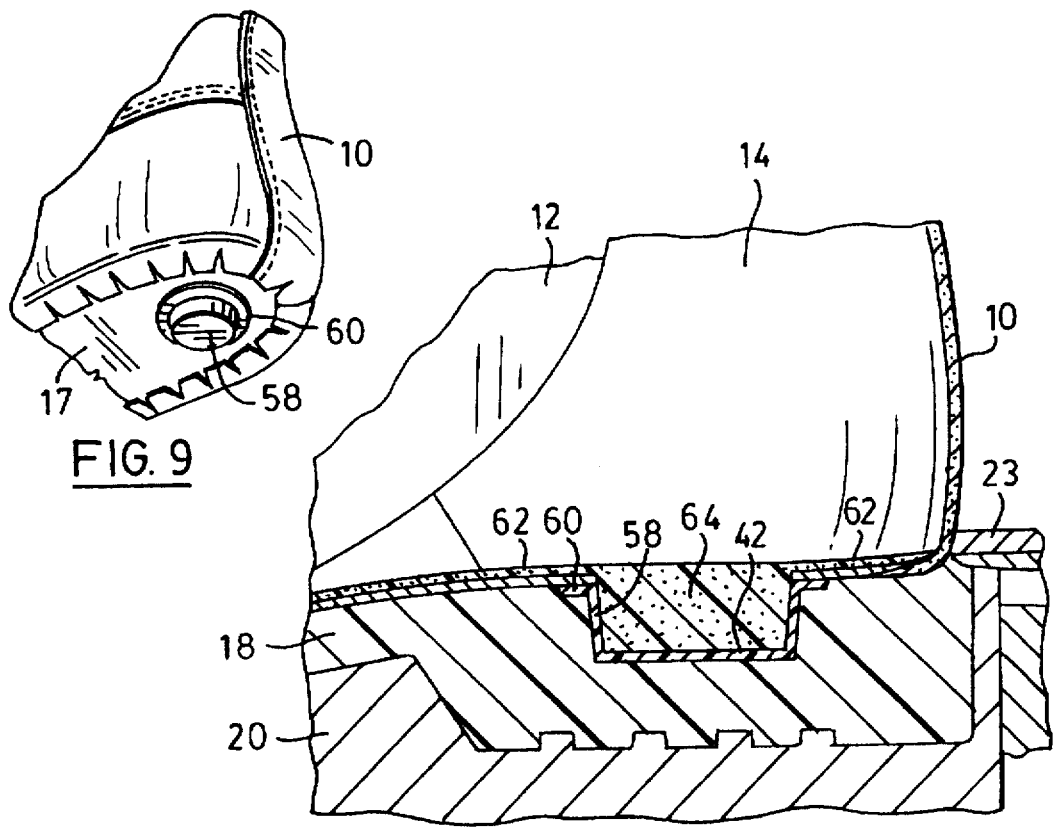
FIG. 9
FIG. 10

METHODS FOR THE PRODUCTION OF RESILIENT MOLDED HEELS FOR BOOTS AND SHOES

CROSS REFERENCE TO A RELATED APPLICATION

This application is a continuation of my application Ser. No. 08/260,243, filed Jun. 14, 1994, now abandoned.

FIELD OF THE INVENTION

This invention relates to methods and apparatus for the production of resilient molded heels for boots and shoes, and to molded heels made by such methods and/or with such apparatus. It relates particularly to methods and apparatus for the production of such molded heels which can be provided with a selectable amount of resilience toward forces acting on the heel resulting from heel strike.

BACKGROUND OF THE INVENTION

In some forms of footwear the outer sole and the heel, which together provide the surfaces that contact the ground, are formed together as a unitary member, while in others they are formed separately and subsequently attached to one another and to the remainder of the boot or shoe. Such a unitary member will be referred to herein as a sole having a sole part or portion and a heel part or portion.

Many proposals have been made hitherto to produce footwear in which the resilience of the soles, particularly in the heel part thereof, is selected in accordance with the type of person and use for which the footwear is intended. Such selection of the resilience may consist of the choice of a particular degree for the entire sole including the heel part, and/or the choice of particular degrees of resilience for different specific parts of the sole. The choice for the heel part is of particular importance, since the major portions of the forces resulting from impacts with the ground are through that part.

For example, U.S. Pat. No. 4,043,058 to Hollister et al discloses an athletic training shoe employing a foam core sole layer and an apertured sole layer, the latter being sandwiched between a harder outer sole layer and the shoe upper. The apertured sole layer has a plurality of strategically placed vertically-extending apertures in order to provide lightweight cushioning at these locations, and preferably has a heel-lift layer positioned below an intermediate sole layer having a soft resilient foam core surrounded by a harder border portion.

U.S. Pat. No. 4,245,406 to Landsay et al discloses an athletic shoe in which an upper and a preformed rubber outsole are joined by means of a molding operation via a polyurethane injection-molded midsole, the midsole having a honeycomb like structure in the region behind the metatarsal area, the spaces in the honeycomb being filled during the molding with foamed polyurethane.

U.S. Pat. No. 4,399,620 to Herbert Funck describes a shoe with a unitary sole which comprises a lower layer of a suitable plastics or rubber material, and an upper layer of light-weight foam material, the thicknesses of the layers varying along the length of the sole and from side to side to provide a desired pattern of resilience.

U.S. Pat. No. 4,581,187 to Sullivan et al describes the production of a shoe innersole comprising a heel and arch section of molded polyurethane foam directly bonded in the molding process to a fullsole material which is either foam or a solid flexible sheet material.

There have been a number of prior proposals for footwear in which hollow air-receiving chambers formed in the sole and in the side walls can be pressurized as required via connecting passages and air valves to change the resilience of the sole and/or to press the side walls against the ankle for increased support. There have also been a number of proposals for footwear in which hollow chambers in the heel portion comprise bellows pumps that are actuated by the heel striking the road surface and pressurize the shoe as described above, and/or provide ventilating air to the shoe interior. Examples of such proposals are in U.S. Pat. Nos. 4,361,969; 4,744,157; 4,991,317; 4,995,173; 4,999,932; 5,025,575 and 5,117,566, and in PCT application PCT/AU92/00554 of J. M. O'Dwyer, published 29 Apr. 1993. All of the foregoing proposals require a multistep operation for the manufacture of the sole, while a further step or steps are required for its incorporation into a shoe by cementing in place, or by molding to the other elements of the shoe.

U.S. Pat. No. 4,435,523 of Ponzielli is concerned with a method of manufacturing articles of foamed thermoplastic material by injection molding, particularly wedge heels for women's shoes. Refrigerated compressed gas at high pressure is introduced into the mass of molten foaming thermoplastic material in order to cool it quickly and thereby reduce the molding cycle time. The specification states that as an incidental result of the method a sort of rough cavity or cavities are formed within the article as the compressed air presses the material against the outer walls of the mold; such voids are not sought and their shape, location, and existence are purely incidental in nature. Because of the random and unpredictable nature and location of the voids, and to ensure that they do not destroy the load bearing capability of the heel, Ponzielli provides vertical cores within the mold about which strengthening columns of tightly structured material are formed.

U.S. Pat. No. 5,204,051 of Jaroschek describes processes for the injection molding of fluid-filled plastic bodies in which a pressurized plastic melt is first injected by a nozzle into the mold cavity of a two or multi-part mold until the mold cavity is completely filled. In order to economize in plastic material and reduce the weight of the product, after cooling until the melt on the walls has set, a pressurized fluid is injected into the still molten interior to expel some of the material into at least one side cavity arranged outside the mold cavity, thereby facilitating the molding of complicated geometric shapes.

SUMMARY OF THE INVENTION

It is a principal object of the present invention to provide new methods of making molded heels for boots and shoes of foamed plastics materials with which the degree of resilience to forces acting vertically through the heel can readily and economically be selected during its manufacture.

It is another principal object to provide apparatus for molding such heels from such foamed plastics materials.

It is a further object to provide new heels for boots and shoes molded from foamed plastics materials with which the degree of resilience to forces acting vertically through the heel has been readily and economically selected during their manufacture.

In accordance with the present invention there is provided a method of molding a heel for boots and shoes comprising:
providing a heel mold having a mold cavity therein adapted to form a molded heel body;
the mold having material passage means with an inlet thereto and an outlet therefrom discharging to the mold cavity for the supply of foaming plastics molding material to the mold cavity;

the heel mold also having fluid passage means with an inlet thereto and an outlet therefrom discharging to the mold cavity at a location at which it is desired to form at least one enclosed hollow chamber within the molded heel;

injecting foaming plastics molding material through the material passage means into the mold cavity to form the molded heel body therein; and after the foaming plastics molding material has completely filled the mold cavity and has contacted the inner walls of the mold cavity to form an outer skin of the molded heel against the cavity inner walls, injecting a pressurized gaseous fluid into the material through the fluid passage means outlet before the material has set to displace and compress the material around the fluid passage means outlet and form said at least one enclosed hollow chamber at the fluid passage means outlet with the centroid of each hollow chamber at the point of discharge of the fluid passage means outlet into the mold cavity;

the size and location of each thus formed hollow chamber being such that the heel is thereby provided with a selected degree of resilience to heel strike forces acting through the heel at the location of the respective hollow chamber.

The heel mold may have a plurality of passage means for pressurized gaseous fluid, each with a respective inlet and a respective outlet to the mold cavity, the fluid passage means discharging to the interior of the mold cavity at respective adjacent locations at which it is desired to form respective adjacent enclosed hollow chambers, whereby the injected pressurized gaseous fluid forms such adjacent enclosed hollow chambers within the interior of the molded shoe heel.

The heel mold may be part of a sole mold in which the molded body comprises a sole with an integral heel part, the sole being incorporated into a shoe in a subsequent operation. The mold may instead be a shoe mold with which the upper side of the mold cavity is closed during a molding operation by a shoe upper to which a molded sole and integral heel is attached by and during the molding operation.

The method may include the step of placing a preformed member in the heel mold prior to a molding operation so as to be incorporated into the heel between the said at least one hollow chamber and the ground-contacting surface of the heel, thus ensuring that the heel has a minimum thickness of at least that of the preformed member between the said at least one hollow chamber and the ground-contacting surface of the heel.

The enclosed hollow chamber may be vented to the ambient atmosphere via a passage formed by the fluid passage means, or it may be sealed from the ambient atmosphere by closing this passage. The enclosed hollow chamber subsequently may be filled with a plastics material of resilience different from that of the foamed plastics material from which the heel is molded, usually of lower resilience, again to adjust the degree of resilience provided by the chamber.

Also in accordance with the invention there is provided a molded heel for boots and shoes comprising a body of molded foamed plastics material having at least one enclosed hollow chamber formed therein during the molding process by the injection of pressurized gaseous fluid into the body during the molding and foaming thereof after the material has foamed sufficiently to form an outer skin against the mold surfaces and before conclusion of the foaming to permit compression and displacement of the foamed material to form the hollow chamber at the point of entry of the pressurized gaseous fluid to the heel body interior, the hollow chamber being disposed in the heel at the location through which heel strike forces act and providing increased resilience to such heel strike forces acting through the heel at the chamber location.

The heel may comprise a plurality of closely adjacent enclosed hollow chambers therein. The heel may comprise part of a shoe sole with an integral heel part for incorporation into a boot or shoe in a subsequent operation. The heel may comprise a preformed member which has been incorporated therein by the molding operation between the said at least one enclosed hollow chamber and the ground-contacting surface of the heel to ensure that the shoe heel has a minimum thickness of at least that of the preformed member between the said at least one enclosed hollow chamber and the ground-contacting surface of the heel.

The enclosed hollow chamber may be vented to the ambient atmosphere via a passage formed by the gaseous fluid passage means, or it may be sealed from the ambient atmosphere by closing this passage. The enclosed hollow chamber may be filled with a plastics material of resilience different from that of the foamed plastics material from which the heel is molded, usually of lower resilience, again to adjust the degree of resilience provided by the chamber.

Further in accordance with the invention there is provided apparatus for molding heels for boots and shoes comprising:

a heel mold having a mold cavity of finished molded heel shape;

a last adapted to receive a boot or shoe upper and to cooperate with the heel mold in holding the upper into contact with the heel mold to close the mold cavity;

material passage means for injecting foamable molding material into the mold cavity to form the heel therein; and fluid passage means passing through the last and having an outlet within the mold cavity when the mold cavity is closed by the upper for injecting a pressurized gaseous fluid into the mold cavity and into the interior of the body of foaming molding material before it has set to form at least one enclosed hollow chamber therein with the centroid of the enclosed hollow chamber at the fluid passage means outlet into the mold cavity.

The fluid passage means may include means for preventing the foaming molding material from entering the fluid passage means before the fluid is injected. The apparatus may comprise a plurality of fluid passage means for injecting pressurized gaseous fluid into the mold cavity to form a corresponding plurality of closely adjacent chambers, each having its centroid at the respective fluid passage means outlet into the mold cavity.

Further in accordance with the invention there is provided a method of manufacturing boots and shoes having a molded heel with which the degree of resilience to forces acting vertically through the heel are selected during its manufacture, the method comprising:

mounting on the underside of a boot or shoe upper at the location of the heel a downward extending hollow member having a hollow interior adapted to form a corresponding molded hollow chamber in the heel upon molding the heel about the hollow member, the hollow member interior being of size and shape required for a corresponding hollow chamber opening into the shoe interior that is thereby formed in the heel;

mounting the upper in a sole mold having a mold cavity that is closed by the upper and injecting a plastics molding material into the mold cavity to form therein a molded sole with a molded heel part enclosing the hollow member; and mounting inside the resultant boot or shoe an inner insole having at the location of the hollow chamber a downward extending projecting portion adapted to fill the hollow chamber, the inner insole downward extending projecting part providing a different selectable degree of resilience from the remainder of the heel to heel strike forces acting vertically through the heel at the location of the downward extending projecting portion.

Further in accordance with the invention there is provided boots and shoes having a molded heel of plastics molding material;

the heel comprising a body of the molding material attached by a molding operation to the boot or shoe upper and having at least one hollow chamber formed therein during the molding by a preformed hollow member attached to the underside of the upper before the shoe heel is molded thereon;

the boot or shoe also comprising an inner insole mounted inside the upper having at the location of the heel a downward extending projecting part adapted to fill the hollow chamber, the inner insole downward extending projecting part providing a different selectable degree of resilience from the remainder of the heel to heel strike forces acting vertically through the heel at the location of the part.

BRIEF DESCRIPTION OF THE DRAWINGS

FIG. 2 is a perspective view from below of the heel part of the boot upper of FIG. 1 to show a detail;

FIG. 3 is a part side elevation, and part cross section on the centerline 3—3 of FIG. 1, of a boot that is a first embodiment of the invention, comprising the boot upper of FIG. 1 after a sole has been molded thereon;

FIGS. 4 and 5 are part cross sections, as with FIG. 3, of the boot heel that are respective other embodiments of the invention;

FIG. 6 is a part cross section of the sole mold of FIG. 1, illustrating the incorporation of an additional component into the boot heel during the molding operation;

FIG. 7 is a horizontal cross section through the heel part of a sole which is a further embodiment of the invention, in which a plurality of separate enclosed hollow chambers have been formed;

FIG. 8 is a similar horizontal cross section through the heel part of a sole which is a further embodiment of the invention, in which a single hollow chamber has been formed from a plurality of connected chambers;

FIG. 9 is a perspective view from below of the heel part of a boot upper that is another embodiment of the invention; and FIG. 10 is a part cross section as with FIG. 3, showing a boot or shoe upper in place in a sole mold ready to mold a boot or shoe that is a further embodiment of the invention using another method of the invention.

The same references are used for the same or similar parts in all the figures of the drawings wherever that is possible.

DESCRIPTION OF THE PREFERRED EMBODIMENTS

Figure 1:
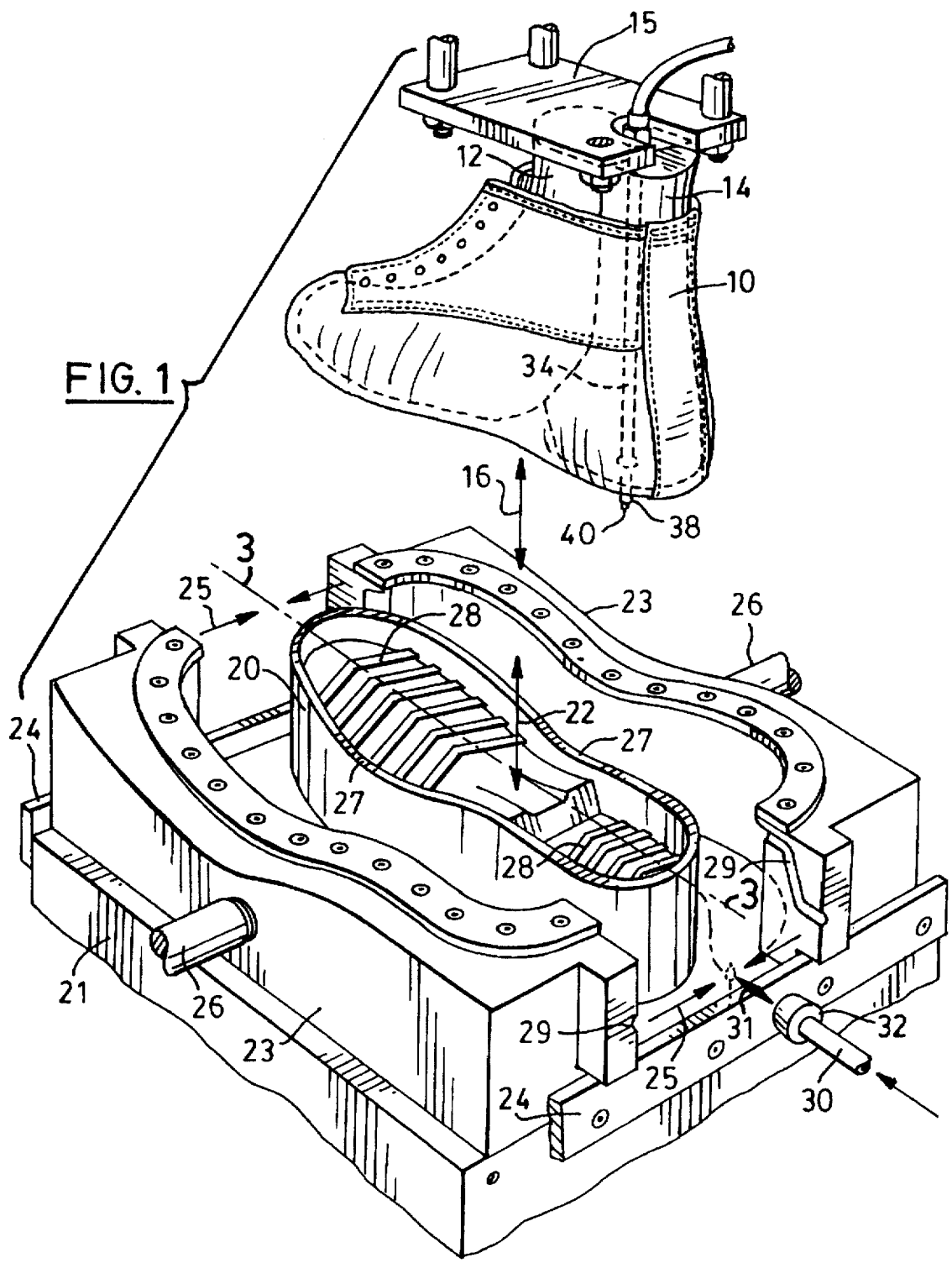
FIG. 1 is an exploded perspective view showing a boot upper in place on a last in accordance with my invention and constituting part of apparatus of my invention, and also showing in open disposition a three-part sole mold for molding a sole on the boot upper.

Work boots and shoes differ in important respects from casual, sports and high-style footwear in that inherently they are required to be durable and protective, and hence must be made of durable materials. Also, they either are bought by employees who tend to regard them as utilitarian products for which they may therefore be reluctant to spend more than is necessary, or they are supplied to the employee by an employer who buys in quantity, with the result that they tend to be more price sensitive than non-work footwear. Nevertheless, there is the desire to provide footwear that is as comfortable as possible to wear and to walk in despite this price constraint, especially since it will usually be worn continuously for the daily period of employment. The provision of a durable sole necessitates the use of materials that are also somewhat rigid, and it is difficult with such materials to provide economically a-work boot or shoe with a heel of sufficient resilience at the area of heel strike. Although as particularly described herein the invention is directed principally to methods and apparatus for the production of work footwear, and to such footwear when produced by the methods and apparatus, it will be apparent to those skilled in the art that nevertheless the invention is applicable to all types of footwear incorporating a molded heel in providing an economical way of selecting during the manufacture the degree of resilience of the heel.

Referring now to FIG. 1, a preformed boot upper 10, made of leather or other suitable equivalent material, is mounted on a two-part metal separable last comprising a toe part 12 and a heel part 14, the separable parts enabling it to be inserted into and removed from the boot upper. The last is mounted on a carrier member 15 which is movable in the directions of arrows 16 by motor means which are not shown. The tabbed turned-in lower edge portion of the boot upper is folded over the outer edge of an insole 17, the two being attached to one another by a suitable adhesive, which is not shown. The bottoms of the boot upper and of the insole are prepared in known manner to receive a molded-in-place sole 18 by abrading and coating with a layer of sealing material (not shown) that prevents the molding material from penetrating too deeply into the leather upper while permitting adequate adhesion thereto. The last cooperates with a metal sole mold comprising a sole part 20 which is mounted on a base member 21 and is movable vertically as required in the directions of arrows 22 by means which are not shown, and two side parts 23 which are mounted on the base member 21 for sideways movement between end guides 24 in the directions of the arrows 25, motor means for such movement being indicated by connection shafts 26. A plurality of lasts and sole molds are mounted on a multistage machine (not shown), usually comprising a turntable, in which the molding process is carried out as the lasts and molds are moved from station to station. The mold side parts 23 are forced together and the last is lowered until the bottom surface of the boot upper butts firmly against the upper edge 27 of the sole part 20, thus forming a tightly closed mold cavity of the final shape for the boot sole with an integral heel part. The bottom surface of the mold cavity is provided with upstanding ridges 28 that produce a corresponding tread groove pattern in the finished boot sole.

The mold side parts are provided with mating semicircular cross section bores 29 which, when the two parts are pressed together, form a material delivery passage with an inlet and an outlet through which foaming plastics molding material is injected into the mold cavity, the material being supplied from a mixing apparatus (not shown) via a feed pipe 30 that is axially movable back and forth in the directions of arrows 31, the feed pipe being provided at the end that contacts the mold side parts with a sealing member 32 that seals the junction between them.

Heel part 14 of the last is provided with a duct or passage 34 that extends vertically downward through it, the duct being connected at its top end to a suitable source (not shown) of pressurized gaseous fluid, usually compressed air, via a control valve 36 (FIG. 2). Lower end 38 of the duct extends through the boot insole 17 approximately at the usual area of heel strike, and protrudes into the mold cavity to an extent sufficient to discharge the pressurized fluid approximately in the centre of the heel part, the open end initially being closed by a sacrificial plug 40. A measured quantity of the foamable plastics molding material, such as a foamable polyurethane, which in its initial freshly mixed state is freely flowable, is injected into the mold cavity through the outlet of the delivery passage 29, when it immediately expands and fills the entire mold cavity, entry of the expanding material into the fluid injection duct 34 being prevented by the plug 40. The foamed material in contact with the walls of the mold sets faster than the remainder of the body of the sole to form the desired smooth outer skin for the molded sole. At a suitable point in the molding cycle, after the skin has formed, and before the solidification of the remainder of the molding material has progressed too far, the valve 32 is opened for a predetermined time period. The entering pressurized fluid blows the plug 40 out of the passage 34 and now causes the formation of an enclosed hollow chamber 42 in the heel part, commencing at the point of entry and spreading outward in all directions with displacement and compression of the still foaming and setting molding material, until a hollow chamber of the desired size has been formed, as shown in FIG. 3. The chamber that is thereby formed will, because of the uniform outward expansion of the compressed fluid, generally be circular in plan and of ellipsoidal transverse cross sections, albeit with small local projections and indentations at the sites of non-uniformities in the molding material, each with the minor axis vertical and the major axis horizontal, and with its centroid at the point of discharge of the passage lower end outlet. The location in plan is chosen as described to be located as precisely as possible at the center of the area of heel strike, while the point of discharge within the heel is chosen to ensure that the chamber is completely enclosed within the heel part with sufficient wall thicknesses on all sides.

After the foamed molding material has solidified and cured to the required extent the boot is removed from the mold and appears as best seen in FIG. 3, with the upper 10 securely attached by the molding operation to the foamed polyurethane sole 17, an enclosed hollow chamber 42 disposed in the heel part beneath the heel strike zone, and an open orifice 44 (FIG. 5) to the interior of the boot where the duct end 38 was removed. The size of the chamber 42 that is obtained can be controlled by a number of factors, such as the nature and pressure of the gaseous fluid that is used, the amount that is injected, the period of time for which injection is continued, and the instant in the molding setting cycle that the injection begins, any increased delay in starting the injection permitting the molding material to set more firmly, so that it is not so easily compressed and displaced. The presence of the chamber 42 in the otherwise somewhat rigid material of the sole increases the resilience of the heel by increasing its compressibility at this location. The size and influence of the chamber will also be affected by the quantity of the foaming plastics material that is injected, the quantity being reduced as compared to a chamber-less sole to maintain the resilience of the remainder of the sole at its customary value. In this embodiment the chamber is vented to the ambient atmosphere and filled with air at atmospheric pressure, so that the heel is quite compressible at this location, so that the size of the chamber is a principal factor in determining the increase in resilience that is obtained.

By way of example only, in specific embodiments in which the molding material is foamed polyurethane, the unfoamed freshly mixed material flows relatively freely and takes only 1–2 seconds for injection into the mold interior. The period required to foam sufficiently to fill the mold usually is about 8–10 seconds from injection, while the period required to form a skin against the mold walls usually is about 10–20 seconds from injection. The material usually requires about 4–5 minutes for it to be sufficiently hardened for the boot to be removed. Again by way of example only, compressed gas will therefore be injected after at least 20 seconds have elapsed, typically in the range 0.35–1.4 Kg/sq cm (5–20 p.s.i.), and the pressure maintained until adequate hardening has taken place, usually for at least about 2–3 minutes.

Foamable materials other than polyurethanes can of course be used for the molded sole, such as for example, synthetic rubbers or PVC materials. Factors that must be considered in obtaining the selected resilience include the nature and chemistry of the foamable molding material, since its choice will present many other variables to be considered, such as the amount of premixing before it is injected, the temperature and pressure at which it is injected, its viscosity at its time of injection to ensure that it flows freely into the mold chamber, and the rate of change thereof during the molding cycle, the size of the sole and particularly of the heel part, and the rate of setting and curing of the material. All of these factors can be readily and economically determined and adjusted by means of a number of tests until the required degree of resilience is obtained.

Although in the embodiment described a sacrificial plug 40 is used to prevent entry of mold material into the duct 38, in other embodiments this may be replaced with an adhesive patch applied over the outlet of the duct, or a one-way valve may be located in the bore at the protruding end of the duct.

The compressibility and resilience of a gas filled hollow chamber 42 can readily be decreased by closing the orifice 44 with a separate plug 46, as illustrated in FIG. 4, and a further selection can be obtained by adjustment of the pressure of the gaseous fluid in the interior of the chamber before the plug is inserted. For example, if this pressure is increased above the ambient pressure the heel will be less compressible; reduction of the pressure below atmospheric may also be employed. In practice, for the sake of economy air is the gaseous fluid most likely to be used both for the production of the hollow chamber and its subsequent filling. Another factor that is available for adjustment of the resilience and compressibility is selection of the contents of the chamber. Thus, as illustrated by FIG. 4, the chamber may be wholly or partly filled with any one of a range of different materials 48, from one that is less compressible than the foamed material forming the heel part, such as a silicone material, to one that is of greater resilience, for example a partly compressible material, such as an open pored foam.

As is shown in FIG. 5, if the chamber is vented to the ambient atmosphere the insole 17 can be provided with a plurality of ventilating apertures 50, by which the air can be exchanged between the chamber interior, the boot interior, and the ambient atmosphere as the wearer walks and the chamber is alternately compressed and decompressed. The invention in this way can also provide an inexpensive method of obtaining ventilation of the boot interior.

It is important to ensure that the part of the heel between the chamber and its ground-engaging surface is sufficiently thick, since this is the part of the boot that usually is subjected to the greatest wear. The thickness can be determined, as described above, by the amount of protrusion of the duct end 38 into the heel part of the mold cavity, but if this does not provide sufficient control, then the method illustrated by FIG. 6 can be adopted, whereby a preformed member 52 of the same or a compatible material as the sole is placed in the bottom of the mold well which forms the heel part. The foaming material will be displaced by the entering pressurized air until the lowermost border of the aperture 42 coincides with the upper surface of the member. The member is preshaped to the shape of this part of the heel and therefore sets a minimum thickness for this part of the heel wall, becoming solidly incorporated into the heel part by the molding operation.

Other ways in which a relatively shallow hollow chamber or chambers can be obtained, especially when the heel is of shallow thickness, is illustrated by FIGS. 7 and 8. The heel part 14 of the last has a plurality of injection passages or ducts 34 (not shown) extending through it parallel to one another, each of which discharges into the heel part of the mold cavity via a respective lower end 38, pressurized gas being discharged simultaneously from all of the outlets. FIG. 7 shows an embodiment in which three outlets are provided and three separate chambers are formed, the chambers being disposed very closely adjacent to one another and only separated by relatively thin flexible walls 54, while a small thin central column 56 remains. In this embodiment the chambers are of two different sizes and disposed approximately at the three corners of a triangle. More than three ducts and other configurations can be used. In the embodiment of FIG. 8 two such outlets are provided, each duct initially producing a respective enclosed hollow chamber 38; the blowing of the gas is continued until the two chambers fuse together and a single wide, flat hollow chamber of peanut shape in plan has been formed. The three chambers of the embodiment of FIG. 7 can also be enlarged until they fuse into a single three-lobed chamber.

The invention has been described as applied to a molded in place sole, but it has equal application to a unit sole where the sole is preformed and then cemented to the boot or shoe upper. Although in the embodiments described above the boot upper 10 and the insole 17 are cemented to one another when installing on the last so as to be ready for direct attachment of the sole, the invention can also be used in the manufacture of shoes and boots with other upper constructions, such as Stitchdowns, Goodyear welts, California Littleways and McKays, and with other methods of assembly, such as string lasting and slip lasting.

In an alternate process illustrated by FIGS. 9 and 10 a downward extending cup-shaped hollow member 58 having an annular flange 60 around its lip is adapted to form a corresponding molded hollow chamber 42 in a boot or shoe heel upon molding the heel about the hollow member and is mounted on the underside of a boot or shoe upper, e.g. to the insole 17 at the location of the heel strike area of the heel part, usually by means of an adhesive between the flange 60 and the insole surface engaged by the flange. This hollow member has an interior of the size and shape required to form a corresponding hollow chamber of the required size, the chamber having an opening of relatively large size into the boot or shoe interior. The member is mounted on the insole underside so that with the upper in place in the mold it protrudes at the required location into the heel part of the mold cavity. As before, the foamable plastics molding material is injected into the mold cavity, when it encloses the element 58 leaving a chamber 42 formed by the member interior opening into the boot or shoe interior. At the conclusion of the molding operation the boot or shoe is removed and an inner sole member 62 is inserted, this sole member 62 having at its heel part a downwardly extending generally cylindrically shaped plug member 64 of shape and size to fit snugly into the chamber 42. The downward extending projecting plug member provides a different, selectable degree of resilience from the remainder of the heel to heel strike forces acting vertically through the heel at the location of the plug member, and the resilience can readily be selected by selection of the characteristics of this plug member. Since such a method only requires the attachment of the member 58 to the insole 17 before the mounting of the boot or shoe upper in the molding machine it can be used with existing molding apparatus while requiring little or no modification thereof.

I claim:

1. A method of molding a heel for boots and shoes comprising:

providing a heel mold having a mold cavity therein adapted to form a molded heel body;

the mold having material passage means with an inlet thereto and an outlet therefrom discharging to the mold cavity for the supply of foaming plastics molding material to the mold cavity;

the heel mold also having fluid passage means with an inlet thereto and an outlet therefrom discharging to the mold cavity at a location at which it is desired to form at least one enclosed hollow chamber within the molded heel;

injecting foaming plastics molding material through the material passage means into the mold cavity to form the molded heel body therein; and after the foaming plastics molding material has completely filled the mold cavity and has contacted the inner walls of the mold cavity to form an outer skin of the molded heel against the cavity inner walls, injecting a pressurized gaseous fluid into the material through the fluid passage means outlet before the material has set to displace and compress the material around the fluid passage means outlet and form said at least one enclosed hollow chamber at the fluid passage means outlet with the centroid of each hollow chamber at the point of discharge of the fluid passage means outlet into the mold cavity;

the size and location of each thus formed hollow chamber being such that the heel is thereby provided with a selected degree of resilience to heel strike forces acting through the heel at the location of the respective hollow chamber.

2. A method as claimed in claim 1, wherein the heel mold has a plurality of passage means for pressurized gaseous fluid, each with a respective inlet and a respective outlet to the mold cavity, the fluid passage means discharging to the interior of the mold cavity at respective adjacent locations at which it is desired to form respective adjacent enclosed hollow chambers, whereby the injected pressurized gaseous fluid forms such adjacent enclosed hollow chambers within the interior of the molded shoe heel.

3. A method as claimed in claim 1, wherein the heel mold is part of a sole mold in which the molded body comprises a sole with an integral heel part, the sole being incorporated into a shoe in a subsequent operation.

4. A method as claimed in claim 1, wherein the mold is a shoe mold with which the upper side of the mold cavity is closed during a molding operation by a shoe upper to which a molded sole and integral heel is attached by and during the molding operation.

5. A method as claimed in claim 1, and including the step of placing a preformed member in the heel mold prior to a molding operation so as to be incorporated into the heel between the said at least one hollow chamber and the ground-contacting surface of the heel, thus ensuring that the heel has a minimum thickness of at least that of the preformed member between the said at least one hollow chamber and the ground-contacting surface of the heel.

6. A method as claimed in claim 1, wherein the enclosed chamber is vented to the ambient atmosphere via a passage formed during the molding operation by the fluid passage means.

7. A method as claimed in claim 1, wherein the enclosed hollow chamber is sealed from the ambient atmosphere by closing a passage formed during the molding operation by the fluid passage means.

8. A method as claimed in claim 1, wherein the enclosed hollow chamber subsequently is filled with a plastics material of resilience different from that of the foamed plastics material from which the heel is molded to adjust the degree of resilience provided by the hollow chamber.

* * * * *